United States Patent
Oishi et al.

(10) Patent No.: US 7,860,065 B2
(45) Date of Patent: Dec. 28, 2010

(54) PACKET COMMUNICATING APPARATUS

(75) Inventors: Shinji Oishi, Yokohama (JP); Tsuneaki Koga, Yokohama (JP); Tatsuhiko Takata, Yokohama (JP); Yuichiro Oishi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 903 days.

(21) Appl. No.: 11/050,558

(22) Filed: Feb. 3, 2005

(65) Prior Publication Data
US 2006/0007952 A1    Jan. 12, 2006

(30) Foreign Application Priority Data
Jul. 9, 2004    (JP)    ............... 2004-203025

(51) Int. Cl.
    *H04B 7/216*    (2006.01)
(52) U.S. Cl. .............. 370/335; 370/312; 370/314; 370/326; 370/329; 370/341; 370/342; 370/343; 370/389; 370/465
(58) Field of Classification Search ........... 370/389, 370/465
See application file for complete search history.

(56) References Cited

U.S. PATENT DOCUMENTS

| | | | | |
|---|---|---|---|---|
| 5,638,365 | A * | 6/1997 | Duault et al. ............ | 370/236.1 |
| 6,473,399 | B1 * | 10/2002 | Johansson et al. .......... | 370/229 |
| 6,477,670 | B1 | 11/2002 | Ahmadvand | |
| 6,542,490 | B1 | 4/2003 | Ahmadvand et al. | |
| 6,961,349 | B2 * | 11/2005 | Malomsoky et al. ........ | 370/469 |
| 6,978,143 | B1 * | 12/2005 | Vialen ................... | 455/452.2 |
| 7,024,201 | B2 * | 4/2006 | Tomishima et al. ....... | 455/452.2 |
| 2003/0081635 | A1 | 5/2003 | Ando et al. | |
| 2005/0193309 | A1 * | 9/2005 | Grilli et al. ............... | 714/752 |
| 2006/0143444 | A1 * | 6/2006 | Malkamaki et al. ......... | 713/160 |

(Continued)

FOREIGN PATENT DOCUMENTS

EP    1 180 878    2/2002

(Continued)

OTHER PUBLICATIONS

Nokia: Flexible RLC-PDU building in Variable Rate WCDMA; Tdoc RAN WG2 035/99 'Online ! Jan. 1998, 3GPP TSG RAN WG2 #1, Helsinki, Finland, XP002348937, Retrieved from the Internet: URL:http://www.3gpp.org/ftp/TSG_RAN/WG2_RL_2/TSGR-01DOCS/pdfs/R2-99035.pdf>, retrieved on Oct. 11, 2005! *p. 3, chapter 4: Handling of variable-size higher layer SDUs * p. 3, chapter 5: Optimising air interface transmission dynamically*.

(Continued)

*Primary Examiner*—Daniel J Ryman
*Assistant Examiner*—Jae Y Lee
(74) *Attorney, Agent, or Firm*—Katten Muchin Rosenman LLP

(57) ABSTRACT

To provide a packet communicating apparatus that can reduce a padding area. A packet communicating apparatus used in a high speed packet communication in a radio mobile communication network includes: an SDU→PDU divider for dividing packet data to be transmitted to an opposite entity, into protocol data units; and a synchronous control signal generator 223 for jointly putting a control signal to change a protocol data unit length, on a padding area of a protocol data unit occurring at a time of the division.

5 Claims, 16 Drawing Sheets

| RLC PROTOCOL PARAMETER | |
|---|---|
| TRANSMISSION PDU LENGTH | 120byte |
| RECEPTION PDU LENGTH | 120byte |
| FRAMED TIMER | 100ms |
| MaxDAT | 10 TIMES |
| Poll_SDU | 1 ITEM |
| Timer_Poll | 40ms |
| Window_size | 1024 ITEM |
| • | • |
| • | • |
| • | • |

U.S. PATENT DOCUMENTS

2007/0079207 A1* 4/2007 Seidel et al. .............. 714/748

FOREIGN PATENT DOCUMENTS

| EP | 1 209 936 | 5/2002 |
| --- | --- | --- |
| EP | 1 211 868 | 6/2002 |
| JP | 8-079228 | 3/1996 |
| JP | 2000-224261 | 8/2000 |
| JP | 2001-326647 | 11/2001 |
| JP | 2002-027023 | 1/2002 |
| JP | 2002-030144 | 1/2002 |
| JP | 2003-143217 | 5/2003 |
| JP | 2003-179974 | 6/2003 |
| JP | 2003-520517 | 7/2003 |
| JP | 2002-125004 | 4/2004 |
| WO | 01/52565 | 7/2001 |

OTHER PUBLICATIONS

Universal Mobile Telecommunications System (UMTS) ; Radio Link Control (RLC) protocol specification (3GPP TS 25.322 version 6.1.0 Release 6); ETSI TS 125 322, Jun. 2004, ETSI Standards, European Telecommunications Standards Institute, Sophia-Antipo, FR, XP014016811 ISSN: 0000-0001 * pp. 13-14, chapters 4.2.1.2 and 4.2.1.3* pp. 24-25, Chapters 9.2.1.3 and 9.2.1.4 * pp. 28-31, chapters 9.2.2.8, 9.2.2.9 and 9.2.2.10 * pp. 57-64, chapters 11.2 and 11.3*.

Universal Mobile Telecommunications System (UMTS) ; Radio interface protocol architecture (3GPP TS 25.301 version 6.0.0 Release 6); ETSI TS 125 301, Dec. 2003, ETSI Standards, European Telecommunications Standards Institute, Sophia-Antipo, FR, XP014016735 ISSN: 0000-0001 *p. 19, chapter 5.3.2.2* pp. 21-23, chapter 5.3.5 * figures 8,9, 9a*.

Notice of Reason for Rejection dated Nov. 17, 2009, from the corresponding Japanese Application.

* cited by examiner

FIG. 2

| RLC PROTOCOL PARAMETER ||
|---|---|
| TRANSMISSION PDU LENGTH | 120byte |
| RECEPTION PDU LENGTH | 120byte |
| FRAMED TIMER | 100ms |
| MaxDAT | 10 TIMES |
| Poll_SDU | 1 ITEM |
| Timer_Poll | 40ms |
| Window_size | 1024 ITEM |
| ⋮ | ⋮ |

FIG. 6

| USER ID | PADDING OCCUPATION RATE 50% EXCESS OCCURRENCE NUMBER |
|---|---|
| U1 | 88 |
| U2 | 34 |
| U3 | 4 |
| ⋮ | ⋮ |

FIG. 7

| PDU LENGTH CHANGE SYSTEM INFORMATION | |
|---|---|
| STATISTICS CYCLE TIME | 1sec |
| PADDING OCCUPATION RATE | 50% |
| PDU LENGTH CHANGE JUDGMENT THRESHOLD | 100 TIMES |
| PDU LENGTH ID=1 | 120byte |
| PDU LENGTH ID=2 | 80byte |
| PDU LENGTH ID=3 | 60byte |
| PDU LENGTH ID=4 | 40byte |
| ⋮ | ⋮ |

FIG. 8

| USER ID | CURRENT PDU LENGTH ID |
|---------|----------------------|
| U1 | 1 |
| U2 | 4 |
| U3 | 2 |
| ⋮ | ⋮ |

SGSN : Serving GPRS Support Node
GGSN : Gateway GPRS Support Node
RNC  : Radio Network Controller
NodeB: Base Transfer Station
MS   : Mobile Station

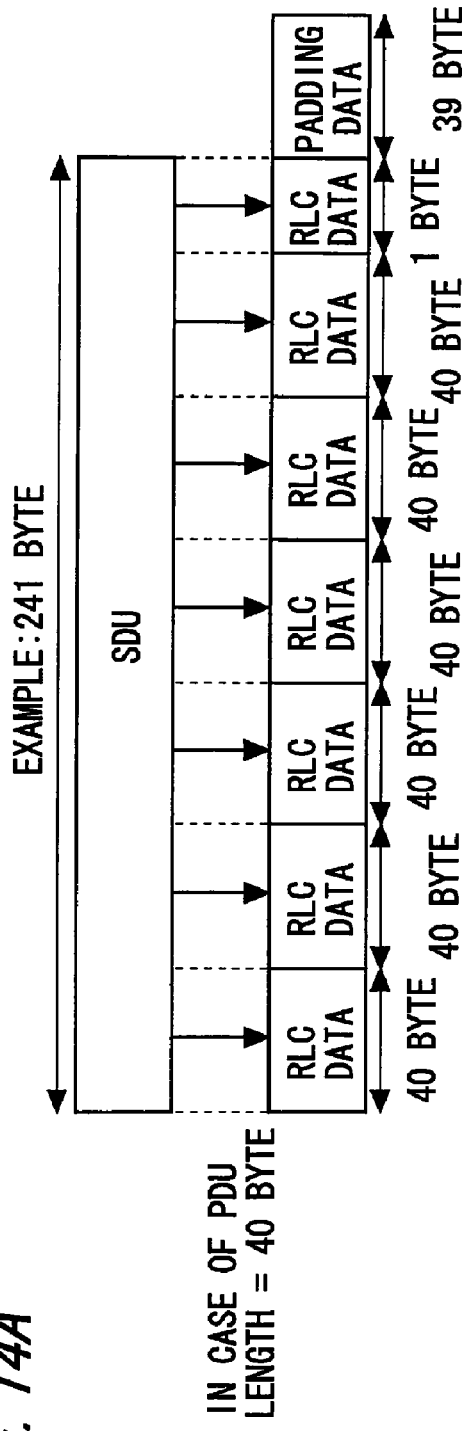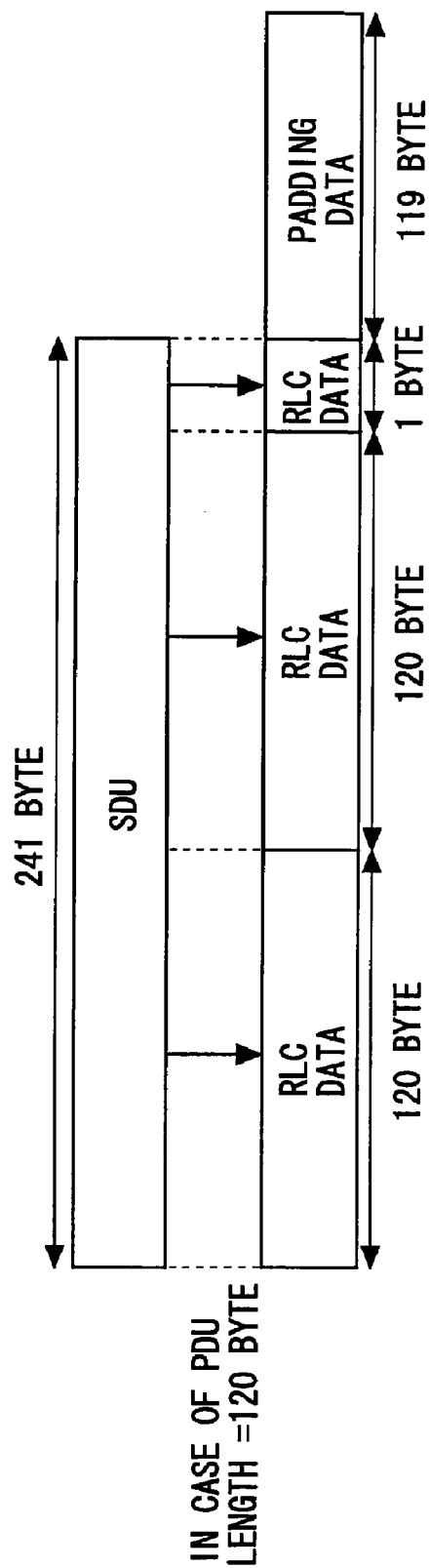

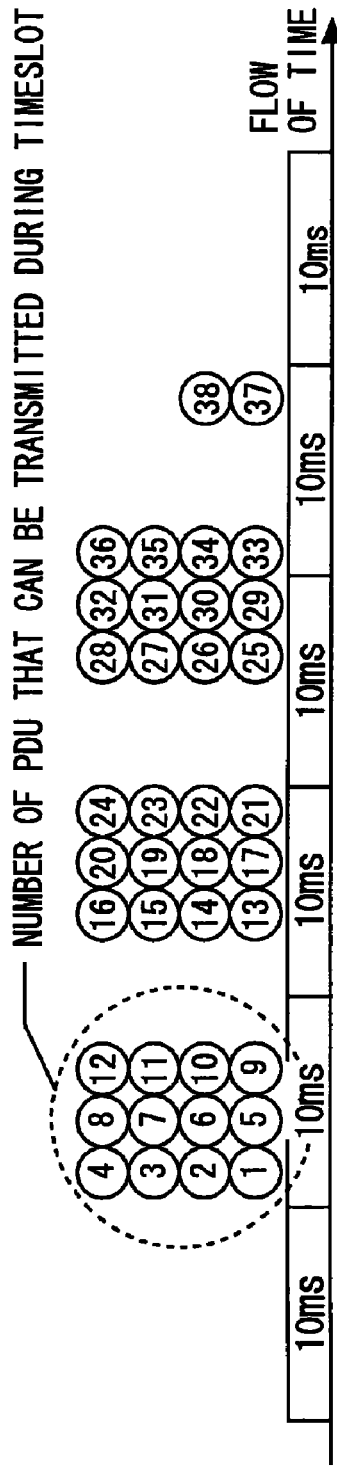
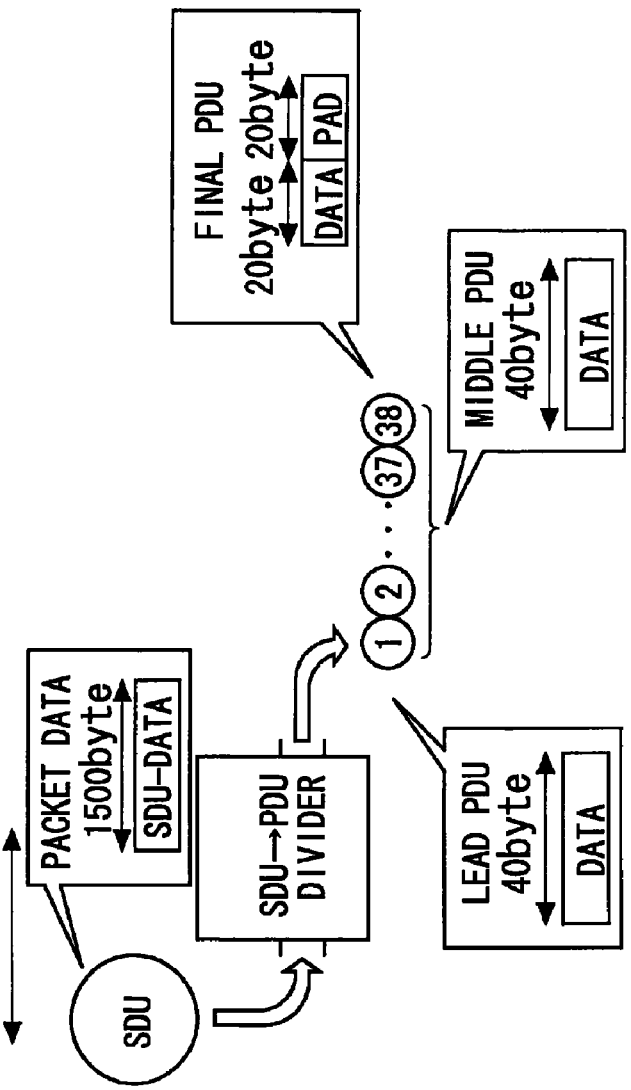
FIG. 15A
FIG. 15B

PACKET COMMUNICATING APPARATUS

BACKGROUND OF THE INVENTION

1. Field of the Invention

The present invention relates to a packet communicating apparatus in a mobile radio network.

2. Description of Related Art

A mobile network of W-CDMA (Wideband Code Division Multiple Access) is provided with a mobile station (MS), a radio base station (NodeB), a radio network controller (RNC), and a radio packet communication node (SGSN GGSN) (FIG. 11). FIG. 11 is a configuration view of a W-CDMA radio network system.

The RNC and the MS each employ an RLC (Radio Link Control) protocol (3GPP Recommendation TS25.322), in order to effectively carry out a packet communication in a radio block. Then, each of the RNC and the MS has an RLC protocol controller to control the RLC protocol. The RLC protocol controllers of the RNC and the MS carry out the division of packet data at a time of data transmission. Also, the RLC protocol controllers of the RNC and the MS carry out the assembly to the packet data from the divided data at a time of data reception (FIG. 12). FIG. 12 is a diagrammatic view of the division and assembly of the packet data of the RLC protocol. Also, FIG. 13 shows an RLC protocol control block diagram in a conventional technique.

Also, the division size of the packet data defined in the 3GPP recommendation is as follows.

1 to 126 bytes (LI=7 bit)
1 to 32,766 bytes (LI=15 bit)
LI:Length Indicator (Information Length Width)

Hereafter, the packet data is noted as SDU (Service Data Unit), and the divided data is noted as PDU (Protocol Data Unit). In an RLC protocol process, if a next transmission SDU does not exist within a framed timer when the SDU is divided, a padding area may exist in the final PDU. Here, the framed timer implies a time when a concatenation transmission process is carried out if there is a transmittable next SDU.

The size of the padding area is determined by an SDU length to be transmitted and a PDU length to be divided. Then, when the PDU length is N bytes, there is a possibility of generation of the padding area having a maximum of (N−1) bytes (FIG. 14A and FIG. 14B). FIG. 14A and FIG. 14B is a conceptual diagram showing an example of the generation of the padding area. FIG. 14A shows that the PDU length is 40 bytes, and FIG. 14B shows that the PDU length is 120 bytes.

Since the padding area is needed in the RLC protocol control, it is transmitted by using a radio resource, between the NodeB and the MS. However, the padding area is not finally used in the RLC protocol process and discarded in the RNC and the MS.

The consideration content with regard to the size of the padding area will be shown below. In the current W-CDMA, the SDU up to 1,520 bytes can be transmitted at the downstream maximum of 384 Kbps and at the upstream maximum of 64 Kbps.

If the SDU of 1,500 bytes is averagely transmitted at 300 Kbps from a fixed network side to the MS in which the PDU length is 40 bytes, the RNC carries out the division and transmission of the SDU at a 40 ms period. The PDU number that can be transmitted in 40 ms is 48. That is, if a transmission speed is 384 Kbps, there is a relation of 40 byte×8 bit×1200/sec=384,000 bit/sec. For this reason, 12 PDUs each having 40 bytes can be transmitted in a 10 ms period (FIG. 15A). FIG. 15A and FIG. 15B is a conceptual diagram of the PDU transmission.

Also, the SDU of 1,500 bytes is divided into 38 PDUs from the relation of 1500 byte÷40 byte/1 PDU=37.5 PDU (FIG. 15B). Then, the user data of 20 bytes and the padding data of 20 bytes exist in the final PDU. Then, the transmission of the PDU including the padding data is executed 25 times per second. For this reason, the data in which a total of 500 bytes is discarded is transmitted. Thus, as shown in FIG. 15B, the uselessness occurs in a radio block.

[Patent document 1] JP 2003-179974 A
[Patent document 2] JP 2002-27023 A
[Patent document 3] JP 2001-326647 A
[Patent document 4] JP 2658896
[Patent document 5] JP 2002-30144 A
[Patent document 6] JP 2002-125004 A

SUMMARY OF THE INVENTION

In future, when an HSDPA (High Speed Downlink Access) service is used to provide a high speed packet communication, the transmission at the downstream maximum of 14.4 Mbps and the upstream maximum of 384 Kbps becomes possible.

In this way, in the high speed packet communication, the downstream speed is dramatically improved over the conventional packet communication. Consequently, the high speed packet communication has a tendency that the transmission SDU increases. Thus, the high speed packet communication has a tendency of the usage of the PDU of the PDU length of the size larger than the conventional PDU length.

The consideration content with regard to the size of the padding data in the HSDPA will be described below. If the SDU of 1,500 bytes is averagely transmitted at 10.8 Mbps from the fixed network side to the MS in which the PDU length is 120 bytes, the RNC carries out the division and transmission of the 9 SDUs at a 10 ms period.

The PDU number that can be transmitted in 10 ms is 150 at a maximum in a case of 14.4 Mbps. That is, from the relation of 120 byte×8 bit×15,000/sec=14,400,000 bit/sec, 150 PDUs each having 120 bytes can be transmitted in the 10 ms period. Also, the 9 SDUs of 1,500 bytes are divided into 113 PDUs, from the relation of 1500 byte×9÷120 byte/1 PDU=112.5 PDU. For this reason, the user data of 60 bytes and the padding data of 60 bytes exist in the final PDU.

Then, the transmission of the PDU including the padding data is executed 100 times per second. As a result, the data in which a total of 6,000 bytes is discarded is transmitted. For this reason, in the case of the HSDPA service, the further uselessness occurs in the radio block.

The HSDPA service has a tendency that irrespectively of the data sent by using the radio resource, the padding data discarded without any usage increases over the conventional packet communication.

Also, the conventional RLC protocol control makes the framed timer long. Then, in the conventional RLC protocol control, a next transmission SDU is easily concatenated. Then, the conventional RLC protocol control suppresses the occurrence of the padding area.

In this conventional RLC protocol control, the transmission of the final PDU is delayed by the framed timer. For this reason, in the conventional RLC protocol control, the transmission of the final PDU is delayed in the high speed packet communication in the HSDPA. Consequently, the conventional RLC protocol control deteriorates the transmission speed of an upper rank protocol, such as a user application, correspondingly to the framed timer. Thus, the conventional RLC protocol control is not the actual control (FIG. 16A and FIG. 16B). FIG. 16A and FIG. 16B is a conceptual diagram showing the usage of the padding area in the conventional technique. FIG. 16A shows the case of concatenating the PDU.

Also, there is a method of effectively using the padding area by jointly putting STATUS-PDU for transmission confirmation as PIGGYBACK-STATUS, on the padding area (FIG. 16B). However, the high speed packet communication has a tendency that a WINDOW size indicating a transmittable PDU number without any transmission confirmation is enlarged to drop the transmission frequency of STATUS-PDU and improve the transmission efficiency. Thus, the padding area may not be effectively used in PIGGYBACK-STATUS (FIG. 16B). In this way, the current system, although having means for effectively using the padding area, does not have a method of positively suppressing the occurrence of the padding area.

The present invention has been proposed in view of the circumstances. It is therefore an object of the present invention to provide a packet communicating apparatus that can reduce a padding area.

According to one aspect of the present invention, there is provided a packet communicating apparatus used in a high speed packet communication in a radio mobile communication network, comprising, dividing unit dividing packet data to be transmitted to an opposite entity, into protocol data units, and jointly putting unit jointly putting a control signal to change a protocol data unit length, on a padding area of a protocol data unit occurring at a time of the division.

In further aspect of the packet communicating apparatus, the apparatus further comprises monitoring unit monitoring an occurrence status of the padding area, and changing unit changing the protocol data unit length, in accordance with a result of monitoring by the monitoring unit.

In further aspect of the packet communicating apparatus, the jointly putting unit jointly puts the control signal including the protocol data unit length after the change and the information indicating a time when the protocol data unit length is changed, on the padding area, between itself and the opposite entity.

In further aspect of the packet communicating apparatus, the apparatus further comprises, receiving unit receiving the protocol data unit, assembling unit assembling the protocol data unit received by the receiving unit into packet data, in accordance with the protocol data unit length reported from a transmission destination of the protocol data unit received by the receiving unit, extracting unit extracting padding data, from the padding area of the protocol data unit received by the receiving unit, and reporting unit reporting the control signal to change the protocol data unit length to the assembling unit if the extracted padding data includes the control signal.

In further aspect of the packet communicating apparatus, the reporting unit reports whether or not the padding area of the protocol data unit received from the opposite entity includes a transmission confirmation signal indicating that the control signal is transmitted to the opposite entity, to the jointly putting unit, and the jointly putting unit re-transmits the protocol data unit, in which the control signal is jointly put on the padding area, until the transmission confirmation signal is received.

According to another aspect of the present invention, there is provided a packet communicating apparatus, comprises, receiving unit receiving a protocol data unit, assembling unit assembling the protocol data unit into packet data, in accordance with the protocol data unit length reported from a transmission destination of the protocol data unit received by the receiving unit, extracting unit extracting padding data, from the padding area of the protocol data unit received by the receiving unit, and reporting unit reporting a control signal to change the protocol data unit length to the assembling unit if the extracted padding data includes the control signal.

DESCRIPTION OF THE DRAWINGS

FIG. 2 is a setting diagram of an RLC protocol parameter at a time of a call setting request, which is used by the RLC protocol controller shown in FIG. 1;

FIG. 6 is a setting diagram of padding statistics data for each user, which is used by the RLC protocol controller shown in FIG. 1;

FIG. 7 is a setting diagram of system information with regard to a PDU length change, which is used by the RLC protocol controller shown in FIG. 1;

FIG. 8 is a setting diagram of PDU length ID management data for each user, which is used by a PDU length manager 222 shown in FIG. 1;

FIG. 14A is a conceptual diagram showing an example of the occurrence of a padding area;

FIG. 14B is a conceptual diagram showing an example of the occurrence of a padding area;

FIG. 15A is a conceptual diagram of PDU transmission;

FIG. 15B is a conceptual diagram of PDU transmission;

DETAILED DESCRIPTION OF THE INVENTION

First Embodiment

Figure 1:
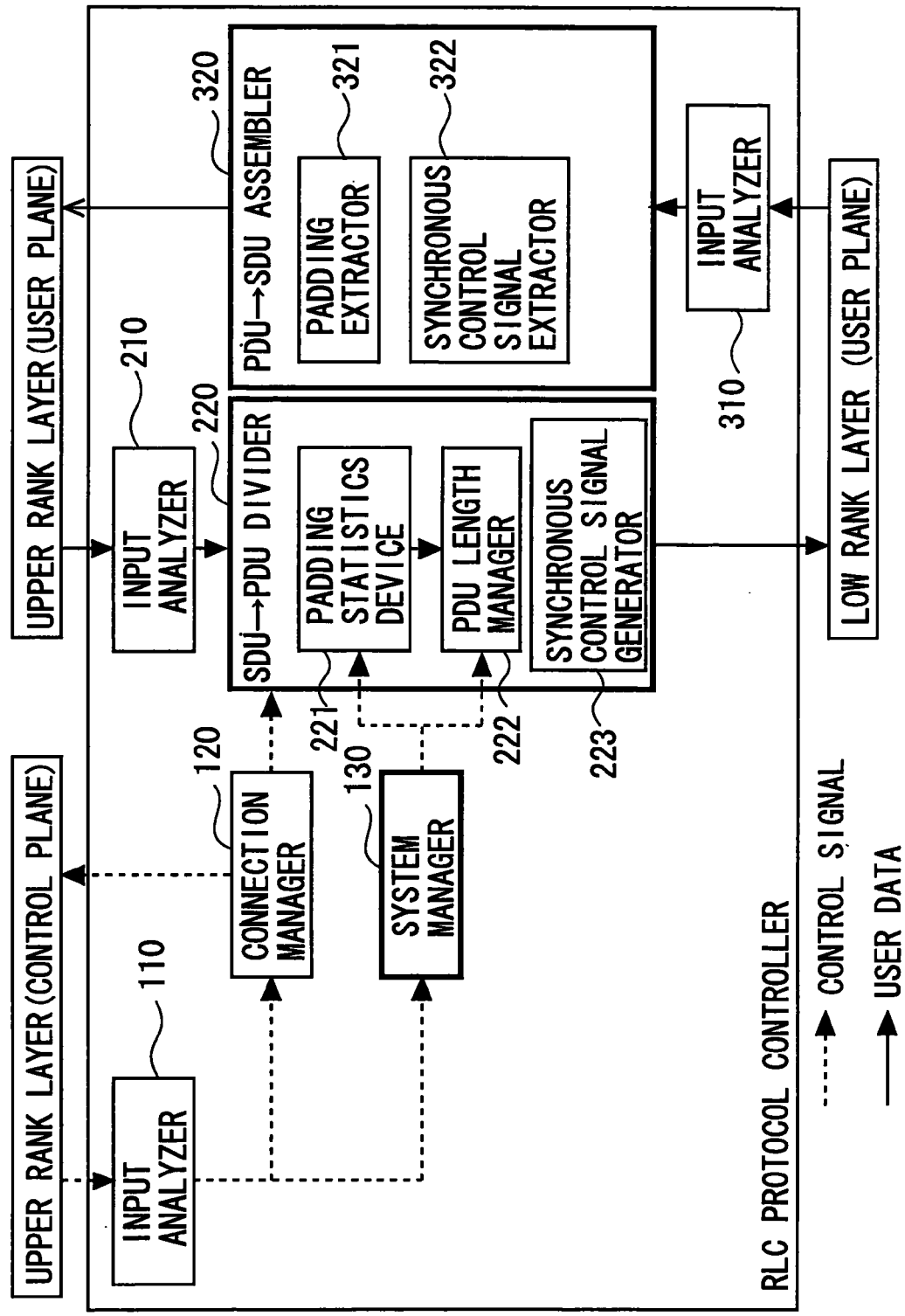
FIG. 1 is a block diagram of an RLC protocol controller, which is used in a first embodiment of a packet communicating apparatus in the present invention.

At first, the first embodiment of the packet communicating apparatus in the present invention is explained with reference to the drawings. FIG. 1 is a block diagram of an RLC protocol controller used in the first embodiment of the packet communicating apparatus in the present invention.

The RLC protocol controller shown in FIG. 1 includes an input analyzer 110, a connection manager 120, a system manager 130, an input analyzer 210, an SDU→PDU divider 220, an input analyzer 310, and a PDU→SDU assembler 320.

Also, the SDU→PDU divider 220 includes a padding statistics device 221, a PDU length manager 222, and a synchronous control signal generator 223. Also, the PDU→SDU assembler 320 includes a padding extractor 321 and a synchronous control signal extractor 322.

The input analyzer 110 analyzes a signal received from an upper rank layer (control plane). The input analyzer 110, when receiving call control information, reports to the connection manager 120. Also, the input analyzer 110, when receiving system information, reports to the system manager 130.

The connection manager 120 reports a resource capture request to the SDU→PDU divider 220 at a user unit, when receiving a call setting request from the call control information reported from the input analyzer 110. Also, the connection manager 120 reports a resource release request to the SDU→PDU divider 220 at the user unit, when receiving a call release request from the call control information reported from the input analyzer 110.

The system manager 130 reports a statistics cycle time and a PDU length change judgment threshold to the padding statistics device 221, from the system information reported from the input analyzer 110. Also, the system manager 130 reports a usable PDU length to the PDU length manager 222, from the system information reported from the input analyzer 110.

The input analyzer 210 analyzes a signal received from an upper rank layer (user plane). Then, the input analyzer 210, when receiving the SDU, reports to the SDU→PDU divider 220. The SDU→PDU divider 220 has the padding statistics device 221, the PDU length manager 222, and the synchronous control signal generator 223.

The SDU→PDU divider 220, when receiving the resource capture request from the connection manager 120, reports a statistics start request to the padding statistics device 221. Also, the SDU→PDU divider 220, when receiving the resource release request from the connection manager 120, reports a statistics end request to the padding statistics device 221.

The SDU→PDU divider 220 reports a user ID and a padding size to the padding statistics device 221, if there is a padding area when the SDU is received from the input analyzer 210. Also, the SDU→PDU divider 220 receives the PDU length change request from the PDU length manager 222. Moreover, the SDU→PDU divider 220 reports a new PDU length, a current sequence number, and the PDU to be jointly put, to the synchronous control signal generator 223, at the timing of the occurrence of the PDU having the padding area where the control signal can be jointly put.

The padding statistics device 221 is a new portion based on the present invention. The padding statistics device 221, when receiving the statistics start request from the connection manager 120, counts the number of the padding occurrences for each user. Also, the padding statistics device 221, when receiving the statistics end request from the connection manager 120, stops the statistics process and clears the counter.

The padding statistics device 221 makes the PDU change request to the PDU length manager 222, if the number of the padding occurrences exceeds the PDU length change judgment threshold during counting. By the way, the padding statistics device 221 carries out the control so that the PDU length is not changed in the rare padding occurrence, by clearing the number of the padding occurrences, at a statistics cycle time interval, after the time of the statistics start request reception.

The PDU length manager 222 receives and manages the usable PDU length from the system manager 130. The PDU length manager 222, when receiving the PDU change request from the padding statistics device 221, selects one of the usable PDU lengths except the PDU length currently used, and reports to the SDU→PDU divider 220. By the way, the PDU length manager 222 manages the PDU length under usage, for each user.

The synchronous control signal generator 223 receives the new PDU length, the sequence number, and the PDU to be jointly put from the SDU→PDU divider 220. Then, the synchronous control signal generator 223 jointly puts a PDU length to be next used and a sequence number in which the new PDU length is effective, together with a check sum value, on the padding area.

The input analyzer 310 analyzes a signal received from a low rank layer (user plane). The input analyzer 310, when receiving the PDU, reports to the PDU→SDU assembler 320. The PDU→SDU assembler 320 has the padding extractor 321 and the synchronous control signal extractor 322. The PDU→SDU assembler 320 receives the PDU from the input analyzer 310. The PDU→SDU assembler 320 passes PDU data to the padding extractor 321, if the padding area exists in the received PDU.

The PDU→SDU assembler 320 executes the SDU assembly at the new PDU length when receiving the new PDU length and the sequence number from the synchronous control signal extractor 322 and if the received PDU belongs to that on and after the sequence number that becomes the timing of the PDU length change. The PDU→SDU assembler 320 reports the assembled SDU to the upper rank layer (user plane).

The padding extractor 321 receives the PDU from the PDU→SDU assembler 320. The padding extractor 321 extracts the padding area from the received PDU. Also, the padding extractor 321 makes an analysis request of the extracted data to the synchronous control signal extractor 322. The synchronous control signal extractor 322 analyzes the data reported from the padding extractor 321. Then, the synchronous control signal extractor 322 reports the new PDU and the sequence number to the PDU→SDU assembler 320.

The operations of the RLC protocol controller shown in FIG. 1 will be described below with reference to FIG. 1 to FIG. 8. When a user (ID=U1) carries out a packet communication, a control signal is inputted from a control plane of an upper rank layer to the RNC and the MS. Then, a call setting request is reported to the connection manager 120.

The connection manager 120 makes the resource capture request to the SDU→PDU divider 220, in accordance with the reported call setting request information. At this time, various parameters for the RLC protocol control are designated to the call setting request information, and with regard to the PDU length, for example, 120 bytes are designated (FIG. 2). FIG. 2 is a setting diagram of the RLC protocol parameter at the time of the call setting request, which is used in the RLC protocol controller shown in FIG. 1.

In the example shown in FIG. 2, 120 bytes is set as the transmission PDU length, 120 bytes is set as the reception PDU length, 100 ms is set as the framed timer, 10 times is set as MaxDAT indicating the maximum re-transmission number, one is set as Poll SDU that is the value indicating the number of SDUs for which poll bits are set, 40 ms is set as Timer Poll indicating the value of a re-transmission timer, and 1,024 is as Window Size.

Figure 3:
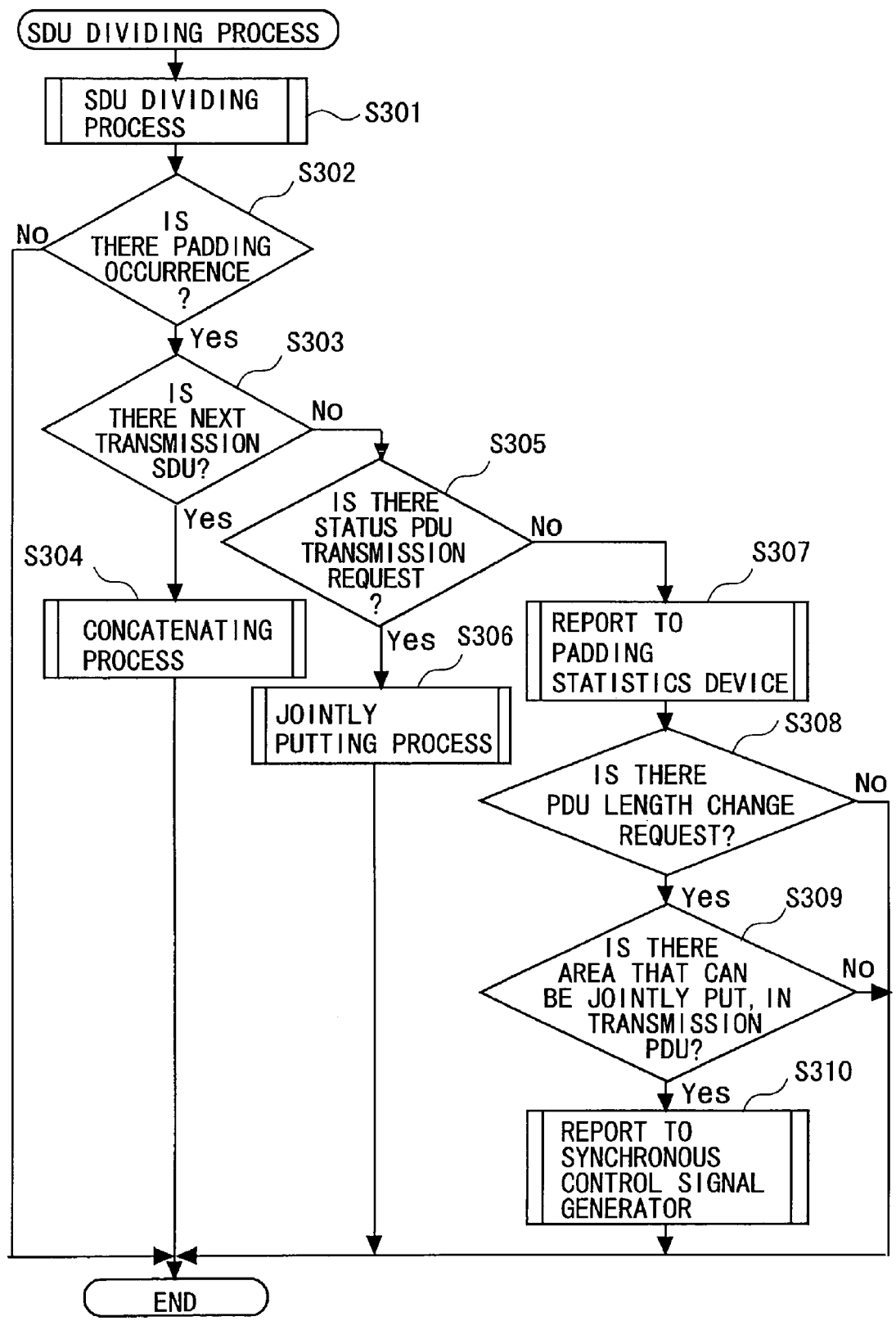
FIG. 3 is a flow chart of a dividing process to PDU from SDU in the RLC protocol controller shown in FIG. 1.

After that, when receiving the SDU of 1,040 bytes from the user plane of the upper rank layer, the SDU→PDU divider 220 divides the SDU at a discrimination of 120 bytes (FIG. 3, S301). FIG. 3 is a flow chart of a dividing process to the PDU from the SDU, in the RLC protocol controller shown in FIG. 1.

Figure 4:
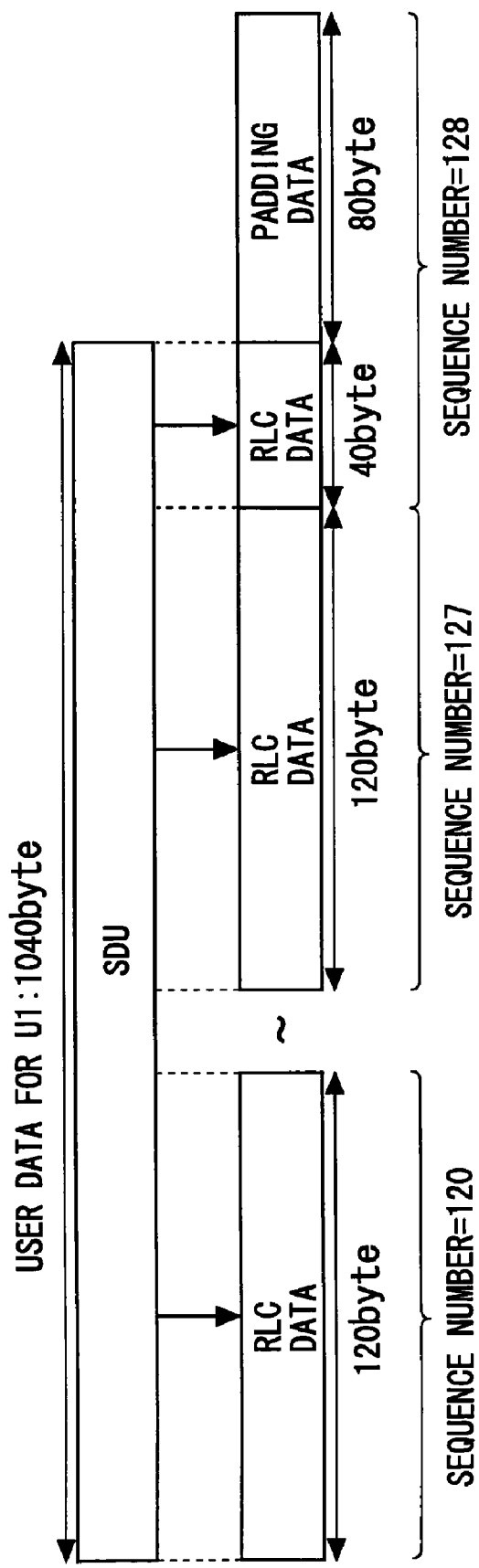
FIG. 4 is a conceptual diagram of a 1,040 byte SDU division for U1 in the RLC protocol controller shown in FIG. 1.

The SDU of 1,040 bytes is divided into 9 PDUs, and the padding area of 80 bytes exists in the final PDU (S302, Yes). At this time, if the RLC protocol controller does not have the SDU to be next transmitted within the framed timer (S303, No) or does not need to transmit the STATUS-PDU for the transmission confirmation (S305, No), it reports the user ID=U1, the PDU length=120 bytes, and the padding size=80 bytes to the padding statistics device 221 (S307, FIG. 4). FIG. 4 is a conceptual diagram of a 1,040 byte SDU division for U1, in the RLC protocol controller shown in FIG. 1.

Also, the SDU→PDU divider 220 carries out a concatenation process at S304, if there is the SDU to be next transmitted (Yes) in the judgment at S303. Also, the SDU→PDU divider 220 carries out the jointly putting process at S306, if there is the necessity of transmitting the STATUS-PDU for the transmission confirmation (Yes) in the judgment at S305.

Also, the SDU—PDU divider 220 judges whether or not there is the PDU length change request at S308. Then, if there is the PDU length change request (Yes), the SDU→PDU divider 220 judges whether or not the PDU to be transmitted has an area that can be jointly put, at S309. On the other hand, the SDU→PDU divider 220 ends the process if there is no PDU length change request (No) in the judgment at S308.

Then, the SDU→PDU divider 220, if the PDU to be transmitted has an area that can be jointly put (Yes), reports to the synchronous control signal generator at S310.

Also, the SDU→PDU divider 220 ends the process, if the PDU to be transmitted does not have an area that can be jointly put (No).

Figure 5:
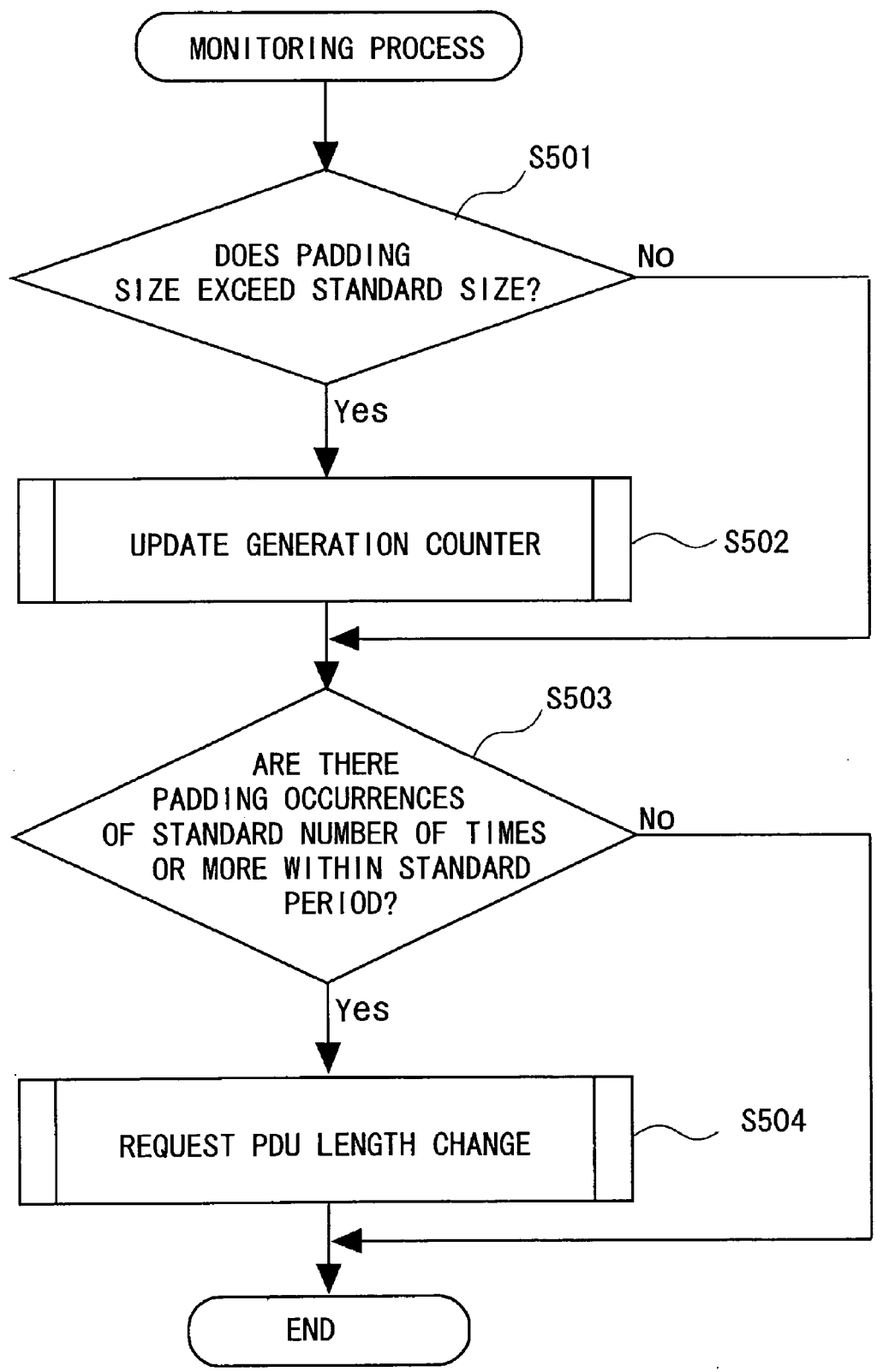
FIG. 5 is a flow chart of a padding occurrence monitoring process in the RLC protocol controller shown in FIG. 1.

Then, the padding statistics device 221 carries out the counting with regard to U1, because a padding occupation rate in the padding of 80 bytes exceeds 50% with respect to the PDU length of 120 bytes (FIG. 5, FIG. 6). FIG. 5 is a flow chart of a padding occurrence monitoring process in the RLC protocol controller shown in FIG. 1, and FIG. 6 is a setting diagram of the padding statistics data for each user, which is used by the RLC protocol controller shown in FIG. 1.

By the way, the padding statistics device 221 clears in advance the counters of all users at one second interval on the basis of the statistics cycle time and the PDU length change judgment threshold set by the system manager 130. Then, the padding statistics device 221 does not make the PDU length change request to the PDU length manager 222, unless the exceeding of the padding occupation rate of 50% occurs 100 or more times within one second (FIG. 7). FIG. 7 is a setting diagram of the system information with regard to the PDU length change, which is used by the RLC controller shown in FIG. 1.

In FIG. 7, 1 sec is set as the statistics cycle time, 50% is set as the padding occupation rate, 100 times is set as the PDU length change judgment threshold, 120 bytes is set as the PDU length of ID1, 80 bytes is set as the PDU length of ID2, 60 bytes is set as the PDU length of ID3, and 40 bytes is set as the PDU length of ID4. Of course, each of the numerals shown in FIG. 7 is one example. For example, the padding occupation rate may not be 50% but be another numeral.

As shown in FIG. 5, the padding statistics device 221 firstly judges whether or not the padding size exceeds a standard size (S501). If the padding size exceeds (Yes) the standard size, the operational flow proceeds to S502, and the padding statistics device 221 updates the generation counter (S502). If the padding size does not exceed (No) the standard size, the operational flow proceeds to S503.

Next, the padding statistics device 221 judges whether or not there are the padding occurrences of the standard number of times or more within the standard period (S503).

For example, the padding statistics device 221 makes the PDU length change request to the PDU length manager 222, if the exceeding of the padding occupation rate of 50% becomes 100 or more times within one second (S504).

Figure 8:
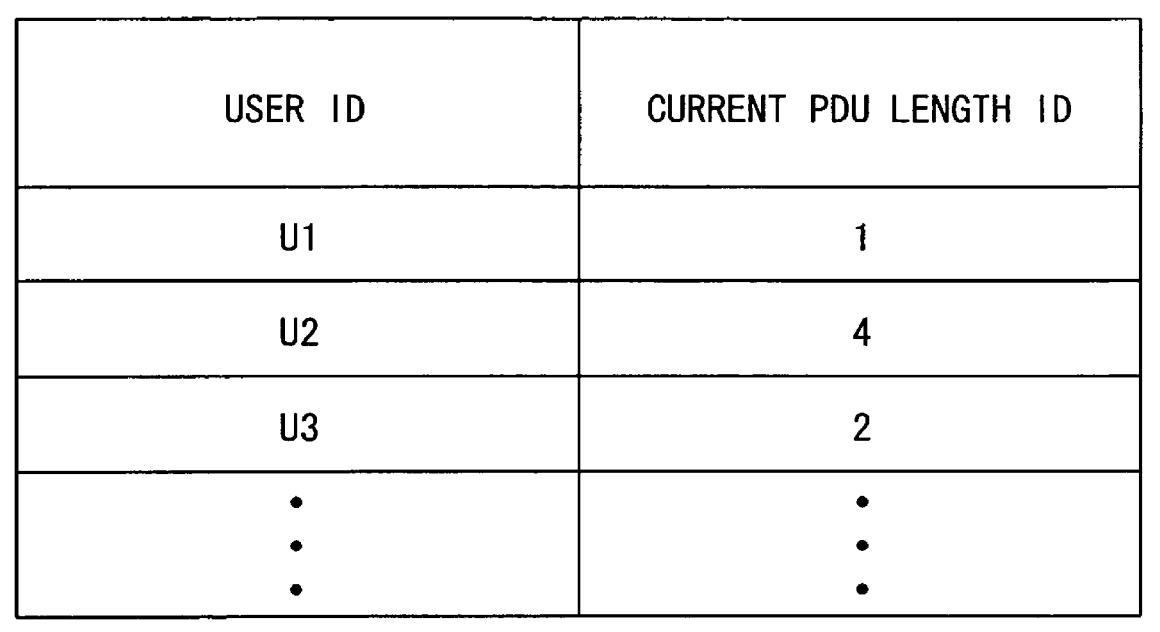

The PDU length manager 222 selects the 80 bytes designated after the current 120 bytes, from the several kinds of the usable PDU lengths preliminarily set by the system manager 130. Then, the PDU length manager 222 reports the new PDU length to the SDU→PDU divider 220. As shown in FIG. 8, the PDU length manager 222 manages the PDU length currently used for each user. FIG. 8 is a setting diagram of PDU length ID management data for each user, which is used by the PDU length manager 222 shown in FIG. 1.

Figure 9:
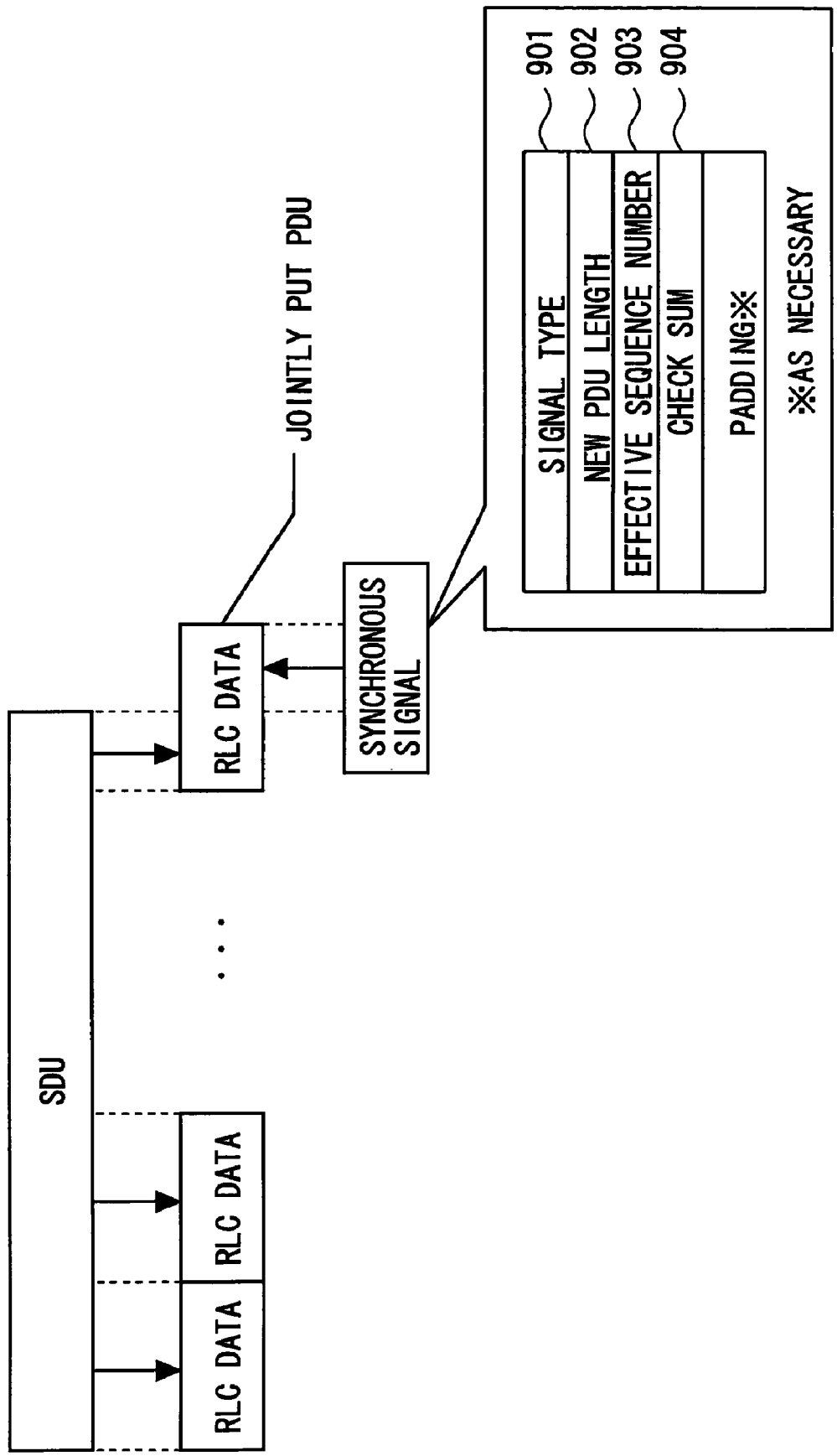
FIG. 9 is a conceptual diagram showing a usage status of a padding area in the RLC protocol controller shown in FIG. 1.

The usage status of the padding area in the first embodiment of the packet communicating apparatus in the present invention will be described below. FIG. 9 is a conceptual diagram showing the usage status of the padding area in the RLC protocol controller shown in FIG. 1.

In the SDU→PDU divider 220, when the SDU transmitted for the U1 is changed from 1,040 bytes to 640 bytes, if its SDU is divided by the conventional 120 bytes, the padding of 40 bytes occurs in the final PDU.

So, when the next transmission SDU and the transmission of the STATUS-PDU for the transmission confirmation are not required, if the PDU length manager 222 makes the change request of the new PDU length to the U1, the SDU→PDU divider 220 passes the new PDU length (80 bytes), the sequence number (128) of the final PDU, and the final PDU to the synchronous control signal generator 223.

The synchronous control signal generator 223 calculates a check sum 904 from a signal type (for example, represented as 0×8001) 901, a new PDU length (for example, represented as 0×0050) 902, and a sequence number+10 (for example, 0×008A) 903, and jointly puts those values on the padding area of the final PDU. By the way, the numeral to be added to the sequence number can be freely set.

The SDU→PDU divider 220 divides the SDU by 80 bytes, as for the size of the PDU length, on the basis of the sequence number+10. Here, when the SDU of 640 bytes is divided, the occurrence of the padding is 0 byte, which suppresses the occurrence of the padding.

The operations of this embodiment will be described below in detail with reference to FIG. 1, FIG. 3, FIG. 5, and FIG. 9. In the RNC and the MS, the signal received from the control plane of the upper rank layer is analyzed by the input analyzer 110.

If the received signal is the call control information, the input analyzer 110 reports to the connection manager 120.

The input analyzer 110 makes the resource capture request to the SDU→PDU divider 220 if the reported call control information is the call setting request. The SDU→PDU divider 220 carries out the resource capture in accordance with the call setting information. Also, the SDU→PDU divider 220 makes the statistics start request to the padding statistics device 221.

On the other hand, the signal received by the user plane of the upper rank layer is analyzed by the input analyzer 210. The input analyzer 210, if the received signal is the SDU, reports to the SDU→PDU divider 220. The SDU→PDU divider 220 defines as an initial value the PDU length reported at the time of the resource capture request from the connection manager 120, and divides the received SDU into the PDU.

The SDU→PDU divider 220, if the padding area occurs when the SDU is divided and if there is the PDU length change request from the PDU length manager 222, jointly puts the control signal to change the PDU length on the padding area and makes the RLC protocol synchronous with an opposite entity. Owing to such operations, this embodiment can change the PDU length.

Also, the SDU→PDU divider 220 reports the user ID and the padding size to the padding statistics device 221 if the padding area occurs when the received SDU is divided into the PDUs, and at that time, the SDU to be next transmitted does not exist, or it is not necessary to jointly put and transmit the STATUS-PDU for the transmission confirmation.

Also, the padding statistics device 221 checks the padding size reported from the SDU→PDU divider 220, for each user.

The padding statistics device 221 counts the number of the padding occurrences if the padding of the standard size or more occurs.

The padding statistics device 221 makes the PDU length change request to the PDU length manager 222, if the number of the padding occurrences exceeds the PDU length change judgment threshold during the counting. By the way, the padding statistics device 221 clears the counter at a certain interval of the statistics cycle time, from the time of the statistics start request reception. Thus, the padding statistics device 221 carries out the control so that the PDU length is not changed, if the padding rarely occurs. Hence, the padding statistics device 221 can suppress the frequent occurrence of the PDU length change.

Also, in this embodiment, the PDU length change is executed in band. The SDU→PDU divider 220 passes the new PDU length, the sequence number given to the current PDU, and the PDU itself to be jointly put, to the synchronous control signal generator 223, if at the time of the division to the PDU from the SDU, the padding area occurs which can contain a control signal required to change the PDU length and there is also the PDU length change request from the PDU length manager 222.

The synchronous control signal generator 223 determines the number indicating the portion several sequences before the current sequence number, calculates the check sum value together with the information on the new PDU length, jointly puts them on the padding area of the PDU passed from the SDU→PDU divider 220, and then makes the RLC protocol synchronous with the opposite entity. The sequence number which becomes the timing of the PDU length change is also transmitted to the SDU→PDU divider 220 and considered at the time of the division to the PDU from the SDU.

In this way, in this embodiment, the padding occurrence status is monitored and statistics-gathered, and the change of the PDU length is executed, which enables the optimal packet communication. Also, in this embodiment, the control signal of the opposite entity to change the PDU length is jointly put on the padding area, which enables the seamless PDU length change.

Second Embodiment

Figure 10:
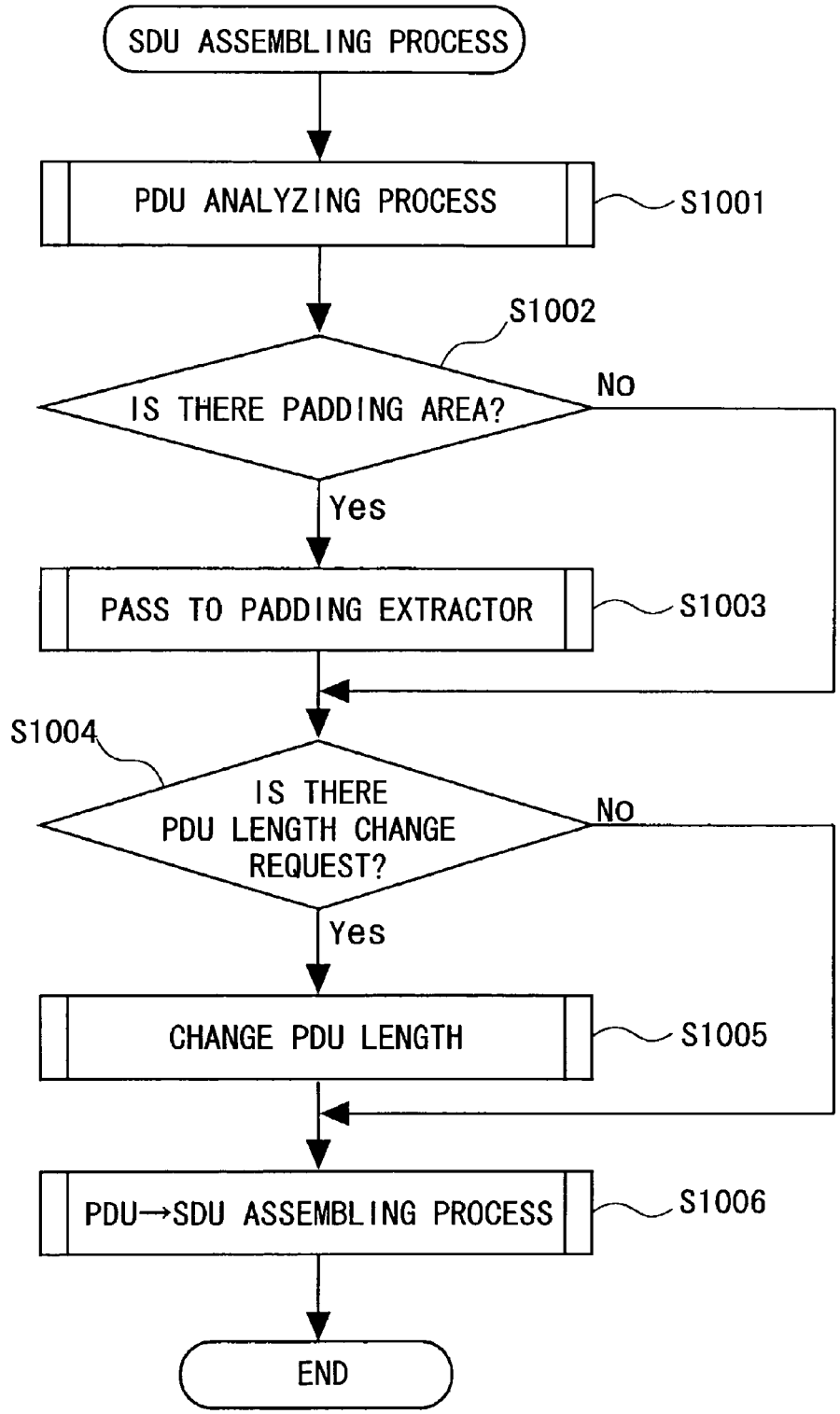
FIG. 10 is a flow chart showing a PDU→SDU assembling process in a second embodiment of the packet communicating apparatus in the present invention.
Figure 11:
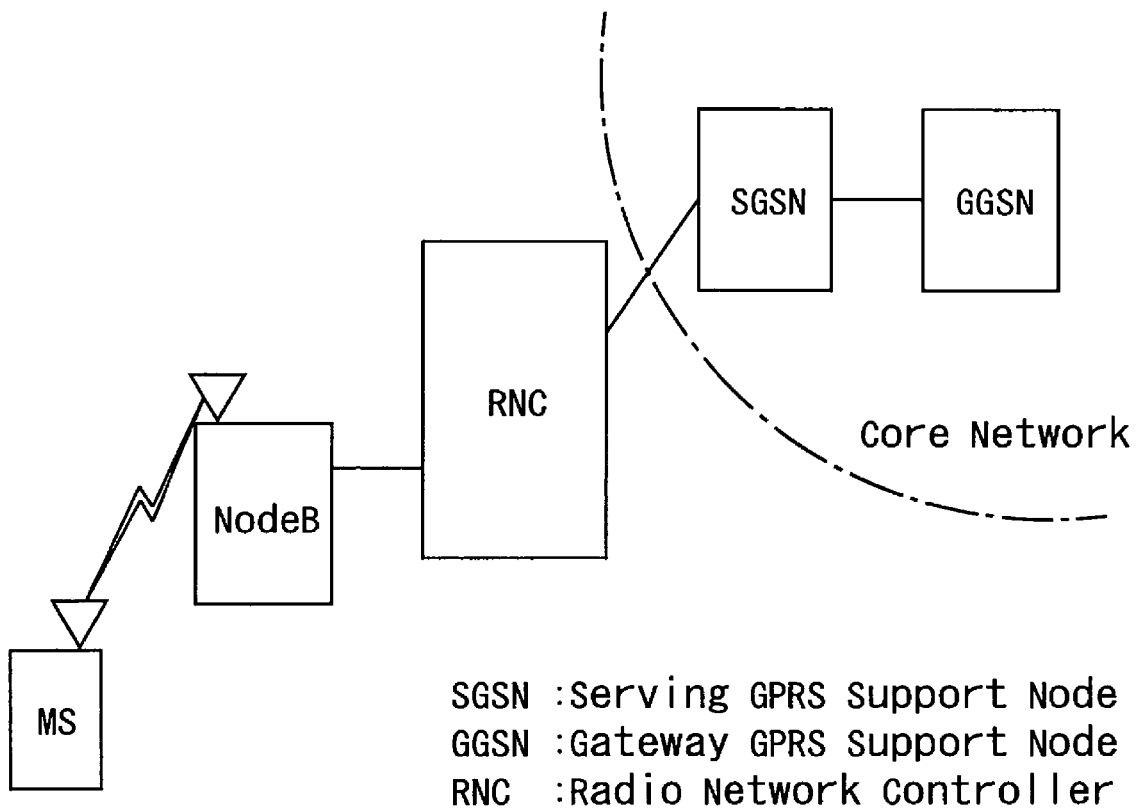
FIG. 11 is a configuration diagram of a W-CDMA radio network system.
Figure 12:
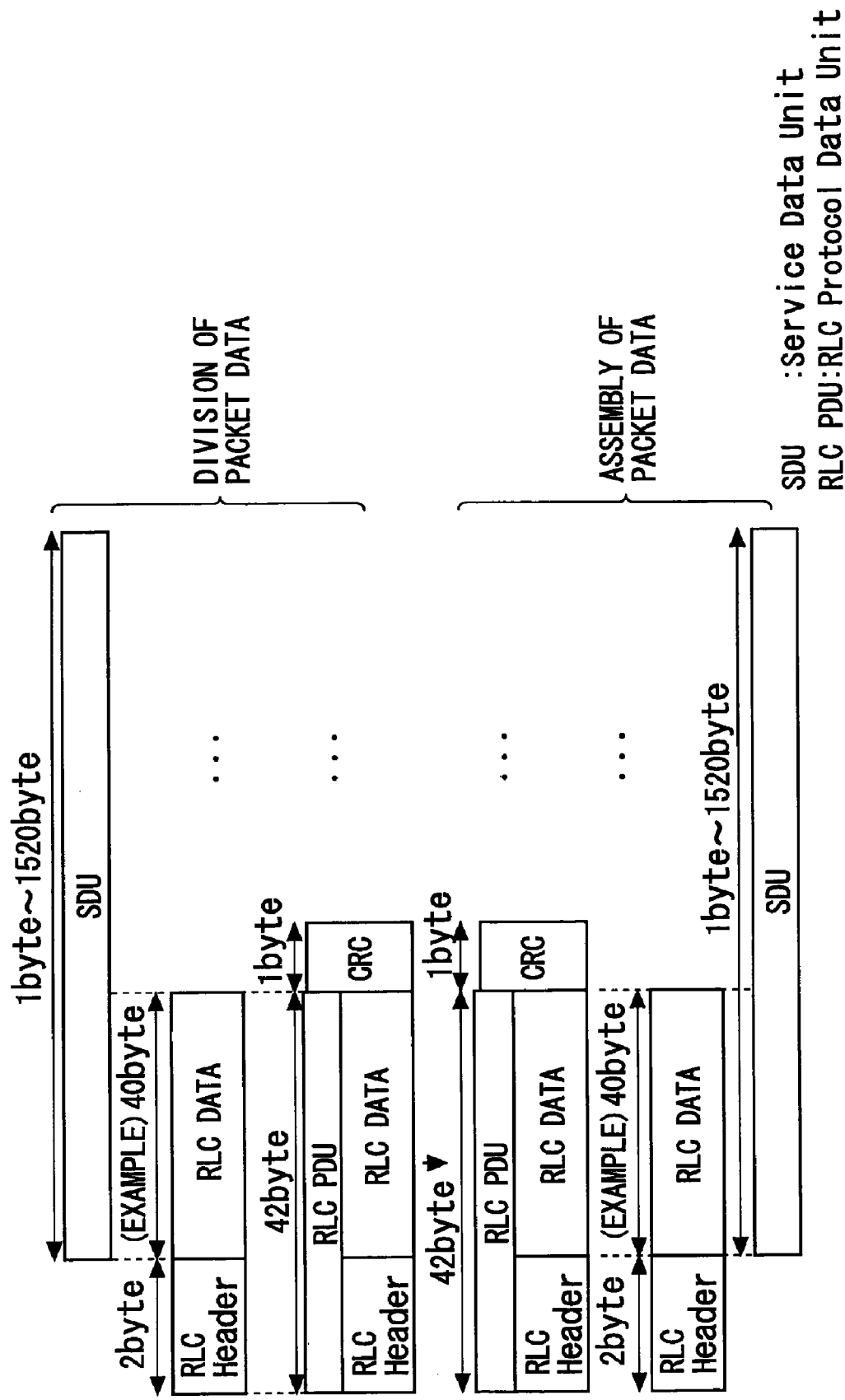
FIG. 12 is a diagrammatic view of division and assembly of packet data of an RLC protocol.
Figure 13:
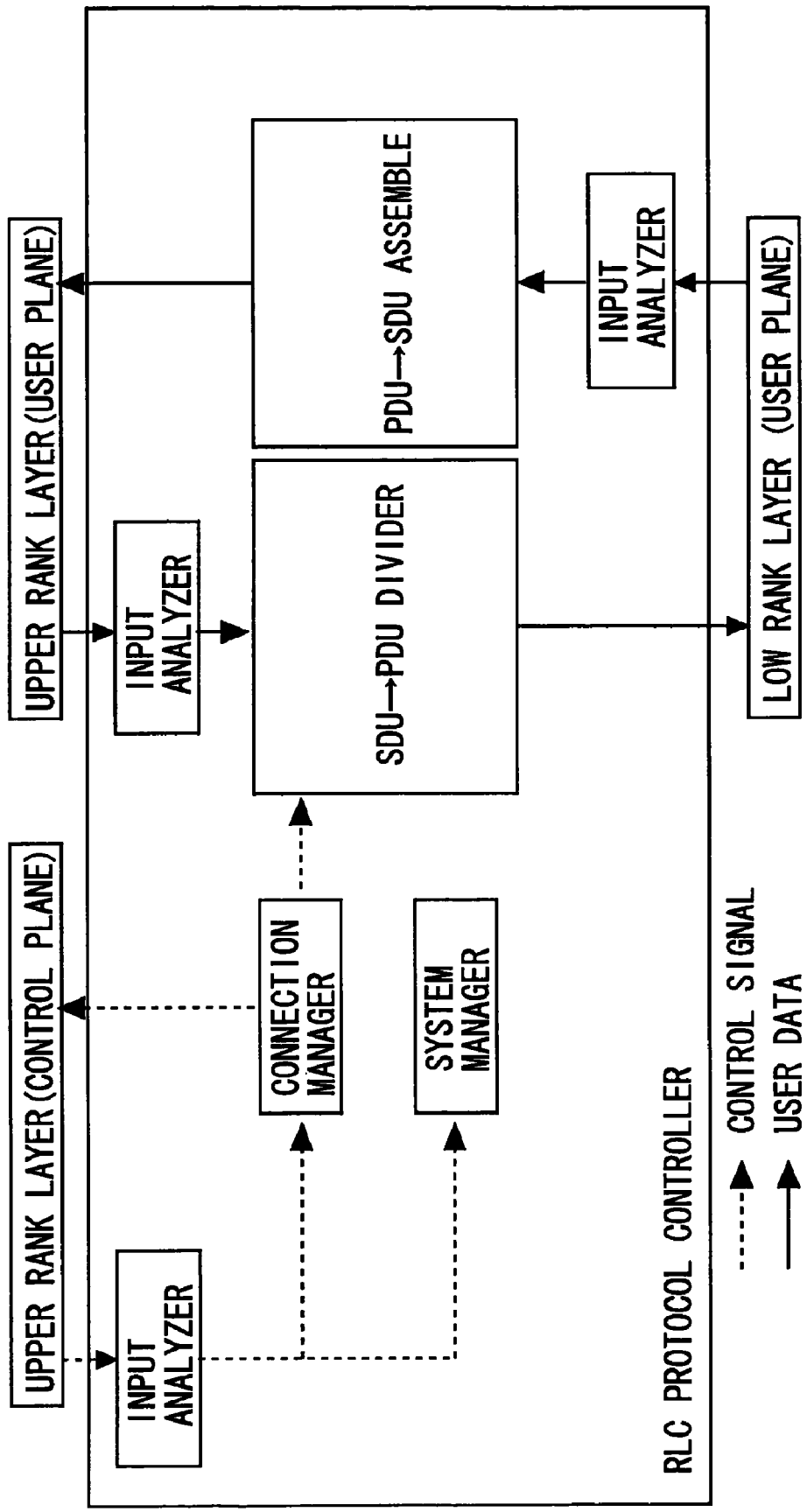
FIG. 13 is an RLC protocol control block diagram in a conventional technique.
Figure 16A:
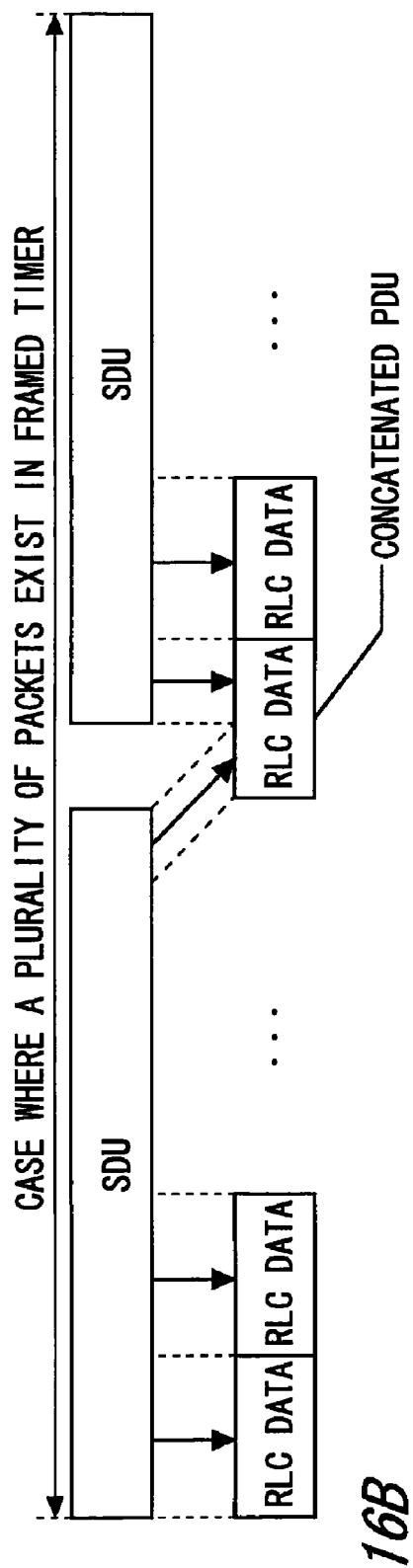
FIG. 16A is a conceptual diagram showing the usage of a padding area in the conventional technique.
Figure 16B:
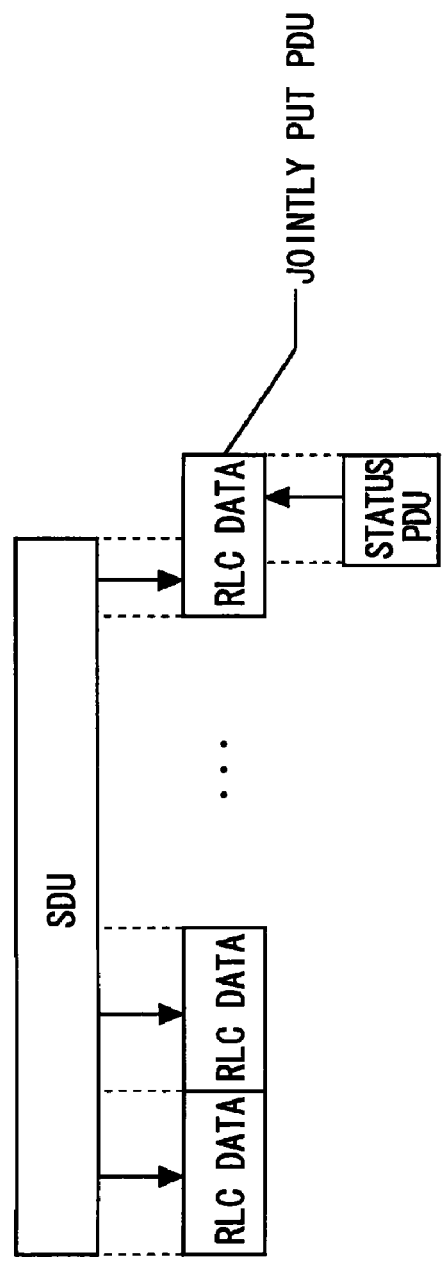
FIG. 16B is a conceptual diagram showing the usage of a padding area in the conventional technique.

The second embodiment of the packet communicating apparatus in the present invention will be described below with reference to FIGS. 1, 9, and 10. FIG. 10 is a flow chart showing the PDU→SDU assembling process in the second embodiment of the packet communicating apparatus in the present invention. Also, FIGS. 1 and 9 are the views to explain the first embodiment of the packet communicating apparatus in the present invention and also used to explain this embodiment.

When receiving the PDU of 120 bytes from the user plane of the low rank layer of the U1, the PDU→SDU assembler 320 carries out the reception from the lead PDU to the final PDU and assembles the SDU.

Then, the PDU→SDU assembler 320 carries out a PDU analyzing process (S1001) and judges whether or not there is a padding area (S1002). For example, if the SDU of 1,040 bytes was assembled, the padding area exists in the final PDU. So, the PDU→SDU assembler 320 duplicates the final PDU and passes to the padding extractor 321 (S1003).

The padding extractor 321 extracts the padding of 80 bytes from the PDU and passes the extracted 80 byte data to the synchronous control signal extractor 322. The synchronous control signal extractor 322 calculates the check sum from the signal type, the new PDU length, and the sequence number, and reports those pieces of information to the PDU →SDU assembler 320, if there is no problem as the synchronous control signal. That is, the synchronous control signal extractor 322 judges whether or not there is the PDU length change request (S1004).

The PDU→SDU assembler 320 changes the PDU length, on the basis of the new PDU length, based on the reported sequence number (S1005), and assembles the SDU (S1006). The embodiment is explained in detail with reference to FIGS. 1, 2, and 9. FIG. 2 is the view explaining the first embodiment of the packet communicating apparatus in the present invention, and is also used to explain this embodiment. The signal received from the user plane of the low rank layer is analyzed by the input analyzer 310 and reported to the PDU→SDU assembler 320 if it is the PDU.

The PDU→SDU assembler 320 defines as the initial value the PDU length reported at the time of the resource capture request from the connection manager 120, and carries out the assembly to the SDU from the received PDU. So, the PDU →SDU assembler 320, if detecting that the padding area exists in the received PDU, passes the PDU to the padding extractor 321.

The padding extractor 321 extracts the padding data from the PDU passed from the PDU→SDU divider 320 and reports to the synchronous control signal extractor 322. Then, the synchronous control signal extractor 322 extracts the information given from the opposite entity.

The synchronous control signal extractor 322 calculates the check sum from the respective values of the signal type, the new PDU length, and the sequence number, on the basis of the data reported from the padding extractor 321, and judges whether or not the extracted padding data includes the control signal to change the PDU length.

The synchronous control signal extractor 322 reports the new PDU length and the sequence number to the PDU→SDU assembler 320 if the control signal is given. Consequently, this embodiment can carry out the PDU length change seamless to the opposite entity. Also, the synchronous control signal extractor 322 discards them if the control signal is not given.

Moreover, in this embodiment, as the method of executing in band the PDU length change explained in the first embodiment, the SDU→PDU divider 220 re-transmits the PDU including the change request control signal of the PDU length until the transmission confirmation signal to the change request of the PDU length can be received from the opposite entity when the control signal is extracted, and surely synchronizes the PDU length change and controls. In this case, the synchronous control signal extractor 322 confirms whether or not the padding area of the PDU includes the transmission confirmation signal indicating that the control signal is transmitted to the opposite entity. Then, the synchronous control signal extractor 322 reports to the SDU→PDU divider 220 that the transmission confirmation signal can be received, if the padding area of the PDU includes the transmission confirmation signal indicating that the control signal is transmitted to the opposite entity.

In this way, in this embodiment, the synchronous control signal to be jointly put on the padding area of the PDU is extracted so that the PDU length can be seamlessly changed.

Also, in the first embodiment and second embodiment of the packet communicating apparatus in the present invention, for example, when the HSDPA service is used to carry out the high speed packet communication, the efficient packet communication can be provided to the RNC and the MS by carrying out the RLC protocol control using the padding area.

Also, in the first embodiment and second embodiment of the packet communicating apparatus in the present invention, since the control is carried out by using the user plane (the control based on the in-band signal) without any new usage of the control plane, the control within the apparatus is not made complex. For example, the control can be attained only by changing the RLC protocol controller mounted in the RNC and the MS.

Also, in the first embodiment and second embodiment of the packet communicating apparatus in the present invention, since the control is carried out in the user plane, it is not necessary to consider the delay in the RLC protocol control signal. Thus, the real time property is excellent, and the execution of the synchronizing process when the PDU length is changed becomes easy.

Also, in the first embodiment and second embodiment of the packet communicating apparatus in the present invention, the upper rank (application) protocol which is transmitted and received between the fixed network and the mobile body is made various. Thus, even if the deviation occurs in the size of the SDU to be converted in the RLC protocol, it is possible to obtain the ideal size for each user with regard to the PDU length. Hence, it is not necessary to customize the system information with regard to the RLC protocol setting value.

Also, in the first embodiment and second embodiment of the packet communicating apparatus in the present invention, for example, the HSDPA service that is the high speed packet communication has a tendency that the PDU length is enlarged and the SDU to be transmitted increases. Thus, with regard to the drop in the padding area, the effect of 10 times or more is obtained as compared with the conventional technique.

Also, in the first embodiment and second embodiment of the packet communicating apparatus in the present invention, for example, in the HSDPA service, the useless resource in the radio block is suppressed to the minimum, which improves the mutual throughputs, in the users located on the HS-DSCH that is a logical channel, and increases the resource that can be used by a different user.

As mentioned above, in the present invention, the jointly putting unit jointly puts the control signal to change the protocol data unit (PDU), on the padding area occurring when the dividing unit divides the packet data (SDU: Service Data Unit), carries out the synchronizing process of the RLC protocol control with the opposite entity, consequently changes the PDU length in real time during communication, and enables the efficient usage of a radio resource.

Also, in the present invention, monitoring unit monitors an occurrence status of the padding area, and changing unit selects a PDU length for each user from a plurality of usable PDU lengths, and changes it to the PDU length suitable for each user in real time, and suppresses the padding area to the minimum. As a result, a radio resource can be efficiently used.

Also, in the present invention, the jointly putting unit jointly puts the control signal including the protocol data unit length after the change and the information indicating a time when the protocol data unit length is changed, on the padding area of the PDU, and can consequently seamlessly change the PDU length.

Also, in the present invention, from the protocol data unit received by the receiving unit, the extracting unit extracts padding data from PDU at the time of the SDU assembly, and the reporting unit extracts the control signal jointly put from the opposite entity terminating an RLC protocol, from the padding area, and reports to the assembling unit. The assembler assembles the protocol data unit from the reported control signal, into packet data, then carries out a synchronizing process with the opposite entity terminating the RLC protocol, and can continuously seamlessly change the PDU length.

Also, in the present invention, the reporting unit reports whether or not the padding area of the received protocol data unit includes a transmission confirmation signal indicating that the control signal to change the PDU length is transmitted to the opposite entity, to the jointly putting unit. Then, the jointly putting unit re-transmits the PDU jointly put on the padding area, until the confirmation of the reception of the transmission confirmation signal. Consequently, the change of the protocol data unit length can be properly executed.

What is claimed is:

1. A packet communicating controller used in a high speed packet communication in a communication network, comprising:
  a dividing portion of the controller to divide a service data unit to be transmitted to an opposite entity, into protocol data units, each of which has a length of a protocol data unit, wherein if a length of a part of the service data unit smaller than the length of the protocol data unit is generated at a division, protocol data units including one of the protocol data units, which contains the part of the service data unit and a padding area, are transmitted to the opposite entity;
  a monitoring portion of the controller to monitor an occurrence status of padding areas of protocol data units;
  a determining portion of the controller to determine change of the length of the protocol data unit used for the division of the service data unit, in accordance with a result of monitoring by the monitoring portion;
  a jointly putting portion of the controller to jointly put a control signal to change the length of the protocol data unit, on the padding area of the one of protocol data units occurring at the time of the division; and
  a changing portion of the controller to change the length of the protocol data unit, in accordance with a result of monitoring by the monitoring portion,
  wherein the monitoring portion counts a number of times that the one of the protocol data units including the padding area, which has a given occupation rate to the length of the one of the protocol data units, occurs, and a next service data unit used to fill the padding area of the one of the protocol data units does not occur within a given unit time, and the determining portion of the controller determines the change of the length of the protocol data unit used for the division of the service data unit if the number of times is equal to or more a given number of times.

2. The packet communicating controller according to claim 1, in which the jointly putting portion of the controller jointly puts the control signal including the length of the protocol data unit after the change and information indicating a time when the length of the protocol data unit is changed, on the padding area, between the packet communicating apparatus itself and the opposite entity.

3. The packet communicating controller according to claim 2, further comprising:
- a receiving portion of the controller to receive the protocol data units from the opposite entity;
- an assembling portion of the controller to assemble the protocol data units received by the receiving portion into a service data unit, in accordance with the length of the protocol data unit reported from a transmission source of the protocol data units received by the receiving portion;
- an extracting portion of the controller to extract padding data, from a padding area of the protocol data units received by the receiving portion; and
- a reporting portion of the controller to report a control signal to change the length of the protocol data unit to the assembling portion if the extracted padding data includes the control signal.

4. The packet communicating controller according to claim 3, in which:
- the reporting portion of the controller reports whether or not the padding area of the protocol data units received from the opposite entity includes a transmission confirmation signal indicating that the control signal is transmitted to the opposite entity, to the jointly putting portion; and
- the jointly putting portion of the controller re-transmits the protocol data units, in which the control signal is jointly put on the padding area, until the transmission confirmation signal is received.

5. A packet communicating controller used in high speed packet communication in a communication network, comprising:
- a dividing portion of the controller to divide a first data unit to be transmitted to an opposite entity, into second data units, each of which has a length of a second data unit;
- a monitoring portion of the controller to monitor padding which is occurred in one of the second data units when a first data unit is divided by the length of the second data unit; and
- a changing portion of the controller to change the length of the second data unit in accordance with the result of monitoring by the monitoring portion; and
- a determining portion of the controller to determine a change of the length of the second data unit used for the division of the first data unit if a number of times that the one of the second data units including the padding, which has a given occupation rate to the length of the one of the second data units, and a next first data unit used to fill the padding of the one of the second data units does not occur within a given unit time is equal to or more a given number of times.

* * * * *